July 10, 1962   C. B. MARBLE   3,043,038
ILLUMINATED DIAL FACE
Filed April 8, 1960
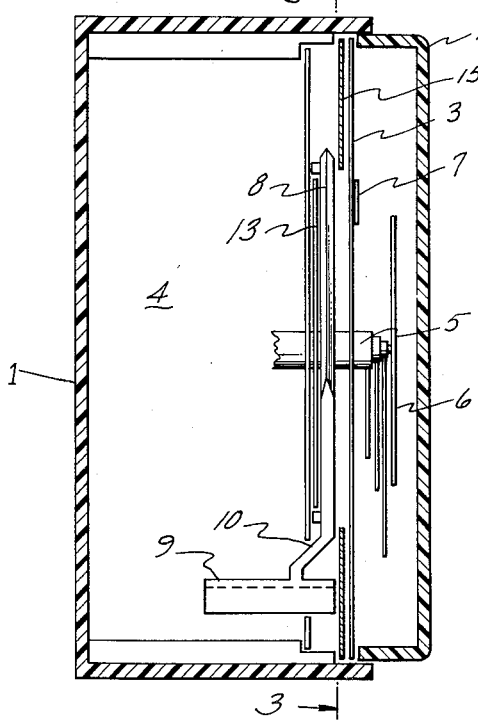
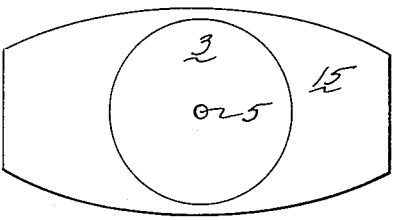
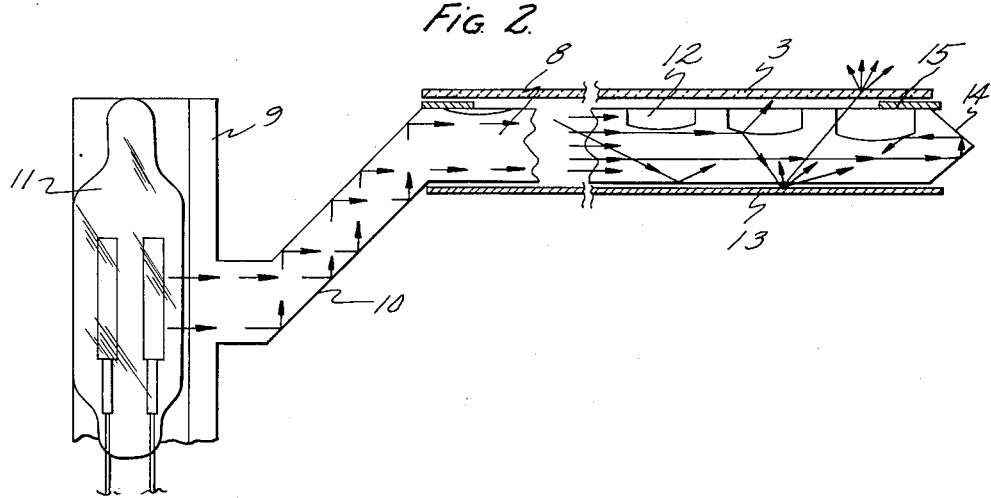
Inventor:
Chester B. Marble
by Zenard J Platt
His Attorney 3,043,038
ILLUMINATED DIAL FACE
Chester B. Marble, Ashland, Mass., assignor to General
Electric Company, a corporation of New York
Filed Apr. 8, 1960, Ser. No. 20,952
6 Claims. (Cl. 40—130)

This invention relates to illuminating means for indicating dials, and more particularly, to an illumination means for a clock dial.

Since the advent of plastics, there has developed a procedure for edge-lighting such indicating devices as plastic dials with the source of illumination located at the edge of the dial and concealed from direct view. The light from this source is conducted by a series of internal reflections through the dial lens and only emerges as visible light when an irregularity such as an engraved mark or the like is encountered in the surface of the lens. This invention relates to an improvement in this type of illuminated dial which provides a novel and unique arrangement which greatly enhances the readability and effect of the dial, both when illuminated at night or in the daytime.

It is, therefore, an object of this invention to provide an improved lighting system for an illuminated dial.

It is a further object of this invention to provide an inexpensive dial illuminating system using one lamp which greatly enhances the novelty and utility of this type of illuminated dial.

One important feature of my invention is the provision of an edge lighted dial arrangement for an illuminated dial which provide a novel lighting arrangement for the dial. This lighting arrangement is effected by utilizing an edge lighted lens assembly which may provide for a uniform distribution of light emanating from the face of the lens through a translucent dial with indicia thereon located in the front of this lens. In accordance with the invention, an opaque mask is situated between the translucent dial and the lens to shield part of the dial so that the shielded part is not illuminated by the light from the lens. In this manner, during the daytime, the entire dial face is easily observed; however, at night, when the internal illumination only becomes visible, the illuminated portion of the dial is considerably decreased because of the shielding effect of the opaque member. In this manner, a unique dial arrangement is provided whereby the entire dial may be easily observed during daytime usage. However, at night when it is desired that a smaller dial face be illuminated for purposes of providing less light in the surrounding area plus allowing for the use of a less expensive lighting arrangement, a smaller dial portion is lighted and visible to an observer.

The subject matter which I regard as my invention is particularly pointed out and distinctly claimed in the concluding portion of this specification. My invention, however, both as to organization and method of operation together with further objects and advantages thereof may best be understood by reference to the following description taken in connection with the accompanying drawings, in which:

FIG. 1 is a detailed view of the entire lighting system employed in a clock assembly;

FIG. 2 is an enlarged view of the particular lens and lamp holder assembly, partially in section, showing the particular way in which the light is conducted through the lens assembly;

FIG. 3 is a plan view of the translucent dial and opaque mask.

Referring now more particularly to FIG. 1, one embodiment of this invention is illustrated in the form of an electric clock or similar device comprising a case 1 with one open side enclosed by a transparent face 2 making visible a translucent dial face 3 located behind this face 2. In the general area 4 is the formal clock or instrument mechanism (not shown) with a control shaft 5 leading therefrom out through the translucent face 3 to control and support various indicating hand 6 which are situated between the transparent face 2 of the clock and the translucent dial 3. Various indicia 7 are located on the translucent dial so as to be readily seen by an observer. Located behind the translucent dial and within the case is a lens assembly 8 which is directly associated with a lamp holder or source of illumination 9. The lens 8 may be formed of any of the materials such as glass, plastic, etc. normally employed for edge lighted applications whereby the illumination from the light source 9 is conducted through a light conductor 10 into the lens 8.

As indicated in the enlarged view marked FIG. 2, an electric lamp or similar illumination device is clamped or otherwise secured in the lamp holder 9 and when illuminated, light emanates therefrom and is conducted through the portion 10 by a series of reflections (as indicated by the arrows) into the lens 8. Located in the front surface of the lens 8 are various indentations 12 which serve as reflector surfaces to intercept the light rays as they pass through the lens 8. These indented reflector surfaces 12 may be semi-spherical in shape and serve to reflect the light in several different angles through the front and back surfaces of the lens 8. Situated adjacent to the back surface of this lens 8 may be a reflector 13. This reflector may be of the form shown in which it is a reflecting or matte white diffusing surface placed on a separate plate, or else it may be a reflecting film deposited directly on the back surface of lens 8.

When the light rays are reflected from the indented reflectors 12 to the reflector surface 13 they are diffused and subsequently reflected back through the lens 8 where they pass through the translucent plate 3 to be visible to an observer. By using the indented semi-spherical reflectors 12 in cooperation with the reflector surface 13 the light is more uniformly distributed over the entire surface of the lens 8 and consequently over the area of the translucent face 3.

It should be noted that the particular structural arrangement of the combined lens and lamp holder is the invention of Harry Albinger and myself and is described in the copending application Serial No. 20,953, filed April 8, 1960, while the particular indented reflectors and self-reflecting edge of the lens is the invention of Harry Albinger and is described in the copending application Serial No. 20,951, filed April 8, 1960; both of these applications are assigned to the present assignee.

In accordance with my invention, an opaque member 15 is positioned between the lens 8 and the dial 3. As illustrated in FIG. 3, the opaque member 15 partially shields the dial 3 in such a manner that illumination being radiated from the lens 8 will only encounter dial 3 in the portion which is not shielded. This unshielded portion is illustrated to be circular in the drawing, however, it is obvious that it may be of any configuration desired. Also, this opaque member 15 may be in the form of a coating on either the dial 3 or the lens 8.

It may be seen that with the translucent dial 3 situated within the clock case 1 and behind the transparent face 2, during normal daytime operation where the surrounding outside illumination is at a higher level, the entire clock face will be visible to an observer and may be easily read. However, when the outside illumination reaches a lower level such as is encountered at nighttime, then only the illuminated portion of the dial becomes readily visible to an observer. It is apparent, however, that the illuminated portion is much smaller than the translucent dial portion and therefore the clock face will have the effect of changing size of configuration from day to night usage. This is a novel effect which has been found to be highly advantageous in enhancing the overall utility of the clock, as the daytime appearance and shape of the clock are not limited to the shape of the illuminating lens.

Since only the smaller area of the dial 3 is illuminated, then a less expensive lighting system may be utilized for this purpose; also the lesser area being illuminated projects less light into the surrounding room at night, this also being an advantageous effect. The use of one long life, inexpensive lamp such as the 1/25 watt neon lamp illustrated in the drawings, makes it reasonable to have the lamp energized continuously night and day, eliminating the need for a switch. The efficiency of this dial construction allows the illumination from this small lamp to be more than adequate for illuminating clock dials and other panels of similar size.

Another beneficial effect of this lighting arrangement is the fact that since less light is needed to illuminate the smaller dial area, then a smaller lamp may be utilized thereby making it economically practical to continuously illuminate the lamp at all times. Since the light is evenly distributed over a certain area of the dial, this light is far less visible in the daytime thereby giving the effect that as the room is darkened, the light is turned on.

During daytime operation, however, by proper selection of the translucency of the translucent dial, the opaque member behind the dial is not visible to an observer and therefore the dial appears to be larger and more readily visible for daytime readability as well as allowing a more interesting shape for the daytime appearance of the clock. During nighttime operation with the clock itself furnishing the illumination for the dial, a smaller dial is advantageous and completely adequate.

While I have illustrated and described a particular embodiment of this invention, modifications thereof will occur to those skilled in the art. I desire it to be understood, therefore, that this invention not be limited to the particular arrangement disclosed and I intend in the appended claims to cover all modifications which do not depart from the spirit and scope of my invention.

What I claim as new and desire to secure by Letters Patent of the United States is:

1. An illuminated dial comprising, a translucent dial face having front and back surfaces, an opaque member adjacent the back surface of said face, at least one opening in said opaque member, a plurality of opaque indicia provided on the front surface of said translucent dial face adjacent the opening of said opaque member illuminating means including a panel lens for passing light through the opening of said opaque member to illuminate the portion of the front surface of said dial in the vicinity of said indicia, said translucent face shielding the opaque member and said light conducting lens from view through the front surface of said face.

2. An illuminated dial assembly comprising a translucent dial having front and back surfaces, a light conducting lens adjacent to the back surface of said translucent dial, illuminating means for transmitting light into the plane of said lens, reflector means in said lens to reflect light out of said lens toward the translucent dial, an opaque member located between said lens and said dial and an opening in said opaque member of less area than said translucent dial so that light from the lens will illuminate only that portion of the dial adjacent to the opening in said opaque member a plurality of opaque indicia provided on the front surface of said translucent dial adjacent the opening of said opaque member, said translucent dial shielding the opaque member and said light conducting lens from view through the front surface of said face.

3. An illuminated dial as recited in claim 2 whereby said reflector means in said lens comprises indentations in said lens to reflect light of of said lens.

4. An illuminated dial assembly comprising, a translucent dial having front and back surfaces, a light conducting lens adjacent to the back surface of said translucent dial, illuminating means for transmitting light into the plane of said lens, indentations in the front surface of said lens to intercept and reflect said light out of the back surface of said lens, a reflector adjacent to the back surface of said lens, said reflector reflecting said light back through said lens towards said translucent dial, an opaque member located between said lens and said dial and an opening in said opaque member of less area than said translucent dial so that light from the lens will illuminate only that portion of the dial adjacent to the opening in said opaque member a plurality of opaque indicia provided on the front surface of said translucent dial adjacent the opening of said opaque member, said translucent dial shielding the opaque member and said light conducting lens from view through the front surface of said dial.

5. An illuminated dial comprising a translucent dial face having front and back surfaces, an opaque coating on the back surface of said face, at least one opening in said opaque coating, illuminating means including a panel lens for passing light through the opening in said opaque coating to illuminate the portion of the dial face adjacent said opening, a plurality of opaque indicia provided on the front surface of said translucent dial face adjacent the opening of said opaque member, said translucent dial face shielding the opaque member and said panel lens from view through the front surface of said face.

6. An illuminated dial assembly comprising a translucent dial having front and back face surfaces, a light conducting lens adjacent to the back surface of said translucent dial, illuminating means for transmitting light in the plane of said lens, reflector indentations formed in the front surface of said lens to reflect light out of said lens toward said translucent dial, an opaque member located behind said dial, an opening in said opaque member of less area than said translucent dial so that light from the lens will illuminate only that portion of the dial adjacent to the opening in said opaque member, a plurality of opaque indicia provided on said translucent dial adjacent the opening of said opaque member, said translucent dial shielding the opaque member and said light conducting lens from view through the front surface of said face, the level of illumination of said light conducting lens and the translucency of said dial being such that the illumination will not be readily noticed in normal daylight.

References Cited in the file of this patent

UNITED STATES PATENTS

| | | |
|---|---|---|
| 2,566,026 | Hughes | Aug. 28, 1951 |
| 2,745,946 | Protzmann | May 15, 1956 |
| 2,775,687 | Cushman | Dec. 25, 1956 |
| 2,805,505 | Hardesty | Sept. 10, 1957 |
| 2,831,453 | Hardesty | Apr. 22, 1958 |
| 2,945,313 | Hardesty | July 19, 1960 |